United States Patent [19]
Murphy

[11] 3,785,774
[45] Jan. 15, 1974

[54] BREATH TESTING SYSTEM WITH BREATH TEMPERATURE SENSOR

[75] Inventor: John E. Murphy, Skokie, Ill.

[73] Assignee: Borg-Warner Corporation, Chicago, Ill.

[22] Filed: July 24, 1972

[21] Appl. No.: 274,712

Related U.S. Application Data

[63] Continuation of Ser. No. 154,381, June 18, 1971, abandoned.

[52] U.S. Cl............................................... 23/254 E
[51] Int. Cl. .......................................... G01n 33/16
[58] Field of Search...................... 23/254 E, 232 E, 23/255 E; 73/23, 25, 26, 27

[56] References Cited
UNITED STATES PATENTS

| | | | |
|---|---|---|---|
| 2,879,663 | 3/1959 | Thomas.......................... | 23/255 E X |
| 3,338,087 | 8/1967 | Moberg et al. ........................ | 73/23 |
| 3,476,516 | 11/1969 | Curry................................ | 23/254 R |

Primary Examiner—Robert M. Reese
Attorney—Donald W. Banner et al.

[57] ABSTRACT

An improvement in alcohol breath testing system wherein a breath temperature sensor is included in the breath input unit and means responsive to the sensor for altering the performance of the system.

9 Claims, 2 Drawing Figures

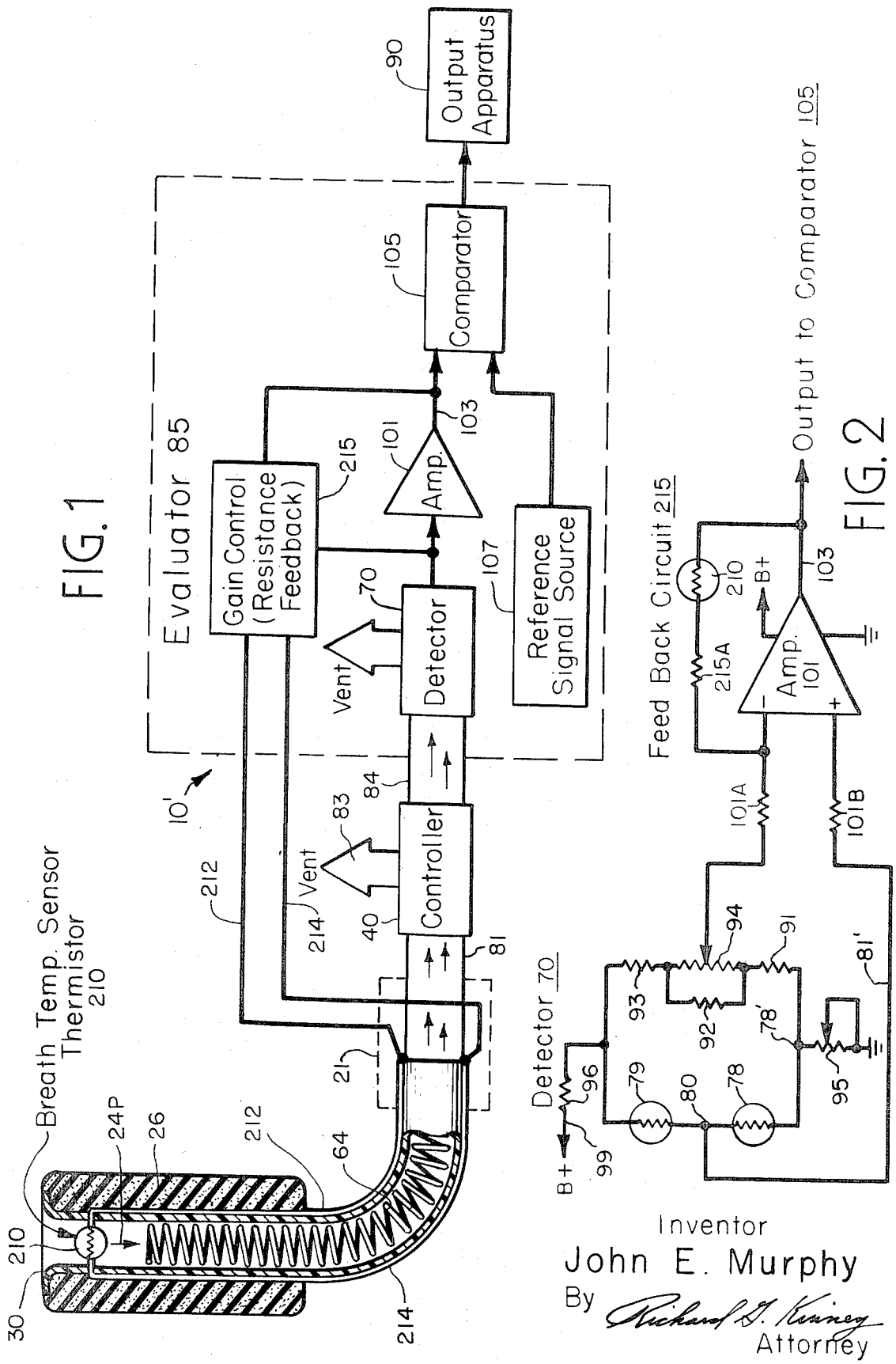

BREATH TESTING SYSTEM WITH BREATH TEMPERATURE SENSOR

CROSS REFERENCE TO RELATED APPLICATIONS

This is a continuation of U.S. Pat. Application Ser. No. 154,381, entitled "Breath Testing System with Breath Temperature Variance Compensation," which was filed on June 18, 1971 and now abandoned.

The present invention is an improvement over the systems of co-pending U.S. applications Ser. Nos. 136,921 and 136,778 respectively entitled "Vehicle Breath Testing System" and "Breath Testing System" each of which application was filed in the names of D. W. Collier, J. P. Hoppesch and A. C. Mamo and are assigned to the same assignee, Borg-Warner Corporation, as the present invention.

BACKGROUND OF THE INVENTION

Alcoholic intoxication represents a major public health and safety problem in most countries in the world and especially in the United States of America. In America the motor vehicle is the principal means of transportation and millions of Americans drive their cars on the public highways each day. According to the Americal Medical Association's Committee on Medicolegal Problems publication, "Alcohol and the Impared Driver," auto accident costs, in 1965 alone, exceeded 8 billion dollars. In human terms, 3½ million injuries were sustained in that year and 49 thousand Americans were killed in auto accidents. Although the contribution of alcohol intoxication to this terrible toll cannot be precisely determined, there is general agreement that, despite stringent anti-drunk driving laws, alcohol intoxication is a factor in a major portion of these accidents.

While various proposals and devices have been made in the past to deal with detection and control of the inebriate these have suffered from several drawbacks. Chemical testing devices tend to be inconvenient, difficult and sometimes dangerous for use by any but a well-trained technician. These devices also tend to be prohibitively expensive. Most of these devices allow for avoidance of an accurate test except in the case of direct and alert supervision. For example, breath tests to be accurate require a deep lung breath sample and can be evaded by inhaling and exhaling repetitively so as to test only oral or mixed breath. Other testers (such as that shown in U.S. Pat. No. 3,311,187), which involve agility, memory, eyesight and/or reaction-time testing do not test alcoholic intoxication as legally defined and allow for errors of inclusion and exclusion.

The term "gas", as used herein and in the appended claims, embraces both ordinary air in the atmosphere, and breath exhaled from the lungs of a human subject.

"Vehicle," as used herein and in the claims, means any human-guided self-propelled unit, such as an automobile, train, airplane, motorboat, on-and off-the road unit, such as snowmobile or bulldozer, and the like.

It has been discovered by experiments that human breath, including deep lung breath, varies in response to the ambient air temperature. Specifically, the breath temperature tends to be significantly lower in low temperature air. However, the change in breath temperature for different persons will vary and even for the same person the change will depend upon numerous factors such as previous activity, period in the environment, etc.

SUMMARY OF THE INVENTION

The present invention takes advantage of these effects to improve the accuracy of the test system. A breath testing system in accordance with the present invention includes the improvement of a sensor for sensing the temperature of the breath supplied to the system and means, for altering the performance of the system in response to the sensed temperature.

Additional features of the present invention which are believed to be novel are detailed in the following description and are set forth with particularity in the appended claims. The invention, together with further advantages and features thereof, may best be understood by reference to the following description taken in connection with the accompanying drawings, in the several figures of which like reference numerals identify like elements.

BRIEF DESCRIPTIONS OF DRAWING

FIG. 1 is a partly sectional, partly block diagram of an improved breath testing system constructed in accordance with the present invention; and FIG. 2 is a detailed circuit diagram of a portion of the system of FIG. 1.

DETAILED DESCRIPTION

In accordance with the practice approved by the Commissioner of Patents in 34 Federal Register 833, the drawings and detailed description of the aforementioned application Ser. No. 136,921 is hereby incorporated by reference as if fully set out here.

The improvement in that system that is the subject of the present invention is best illustrated by reference to FIG. 1, hereof, wherein the improved system is generally designated 10'. The system 10' includes an input unit 21, which receives the exhaled breath and transfers it to a controller 40 from which it is coupled to a detector 70 which is part of an evaluator 85. The detector produces an electrical output which is coupled to an amplifier 101 whose output is compared in a comparator 105 with a reference signal from the source 107. The output of the comparator 105 serves as the "pass" or "fail" signal 87 and is coupled to the output apparatus 90.

As thus far described, the system 10' is identical to that of the aforementioned and incorporated by referenced application. In accordance with the present invention, the input apparatus 21 is provided with means for sensing the breath temperature which means may be a thermistor 210 mounted in the breath passageway 24P downstream of the opening 30 and upstream of the heater wire 64. The thermistor 210 is connected by electrical conductors 212, 214, to form part of a gain control circuit 215 which serves as means responsive to the breath temperature sensing means, for controlling the overall response of the system 10'.

The circuit 215 is a resistive feedback circuit from the output 103 of the amplifier 101 to its input, as is best shown in FIG. 2 hereof. Referring to FIG. 2 the circuit of the detector 70 is shown in greater detail and, includes a Wheatstone bridge circuit connected between a regulated source of d.c. potential (B+) and a reference or ground potential which bridge circuit includes a catalytically active element 70 and passive element 78 which are exposed to the breath sample as explained in detail in the incorporated material. The output of the bridge is taken from between the arm of the potentiometer 94 and the line 81' and is fed through, respectively, resistors 101A and 101B to the primary negative and positive inputs of the operational amplifier 101. The feedback circuit 215 includes the thermistor 210 connected in series with a resistor 215A from the output 103 of the operational amplifier 101 to its primary negative input.

In overall operation the thermistor senses variations in breath temperature and in response thereto, changes its resistance. This change in resistance alters the feedback to the amplifier input to change its gain from a nominal level corresponding to a normal breath temperature to a higher gain for lower breath temperatures as to a lower gain for higher breath temperatures.

Of course the thermistor may be used to alter the reference signal level or the comparator operation to achieve the same result.

While one particular embodiment of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed as the invention is:

1. In a breath testing system of the type in which a detector output electrical signal is derived from a detector which signal may reflect both breath alcohol content and breath temperature variation from a norm and which signal is thereafter processed to produce an output signal, the improvement comprising:
   means for sensing the breath temperature of incoming breath; and
   means for altering the production and processing of the detector output signal in deriving the output signal so that the effect of breath temperature variation from the norm is lessened.

2. The invention of claim 1, wherein:
   said temperature sensing means is a temperature responsive device mounted in a breath input unit so as to be substantially in the breath flow path.

3. The invention of claim 2 wherein:
   said temperature sensing means is a thermistor.

4. In a vehicle, having a breath testing system of the type having a breath input unit receiving a gas sample and adapted to have a driver exhale his breath in a continuous flow thereinto, and of the type having means for producing an electrical signal from the gas sample, and means for processing said signal which processing means includes an amplifier for amplifying that signal and a comparator for comparing the amplified signal to a reference signal and for producing an output signal indicative of a "pass" or "fail" condition, the improvement comprising:
   a breath temperature sensor in the breath input unit for sensing the temperature of the gas sample received therein, said sensor being actively coupled to said processing means for altering the processing of the electric signal to compensate the processing for sensed temperature variations of the gas sample from a nominal temperature.

5. The invention of claim 4 wherein:
   said breath temperature sensor is a thermistor; and
   the amplifier of the signal processing means includes a feedback network which includes said thermistor;
   whereby an automatic gain control is provided to compensate for variations in gas sample temperature.

6. The invention of claim 4 wherein said temperature sensor is a thermistor.

7. In a breath testing system of the type having a breath input unit, the improvement of:
   a breath temperature sensor, and
   means responsive to said sensor for altering the performance of the system.

8. In a breath tester of the type having a breath input unit:
   a thermistor coupled to the breath input unit and responsive to the temperature of gas passing into said unit, and
   means, including said thermistor, for developing a signal indicative of the temperature of the gas passing into said unit.

9. In a vehicle, having a breath testing system of the type having a breath input unit receiving a gas sample and adapted to have a driver exhale his breath thereinto, and of the type having means for producing an electric signal from the gas sample, and means for processing said signal, the improvement comprising:
   a breath temperature sensor in the breath input unit for sensing the temperature of the gas sample received therein, said sensor being actively coupled to said processing means for altering the processing of the electric signal.

* * * * *